UNITED STATES PATENT OFFICE.

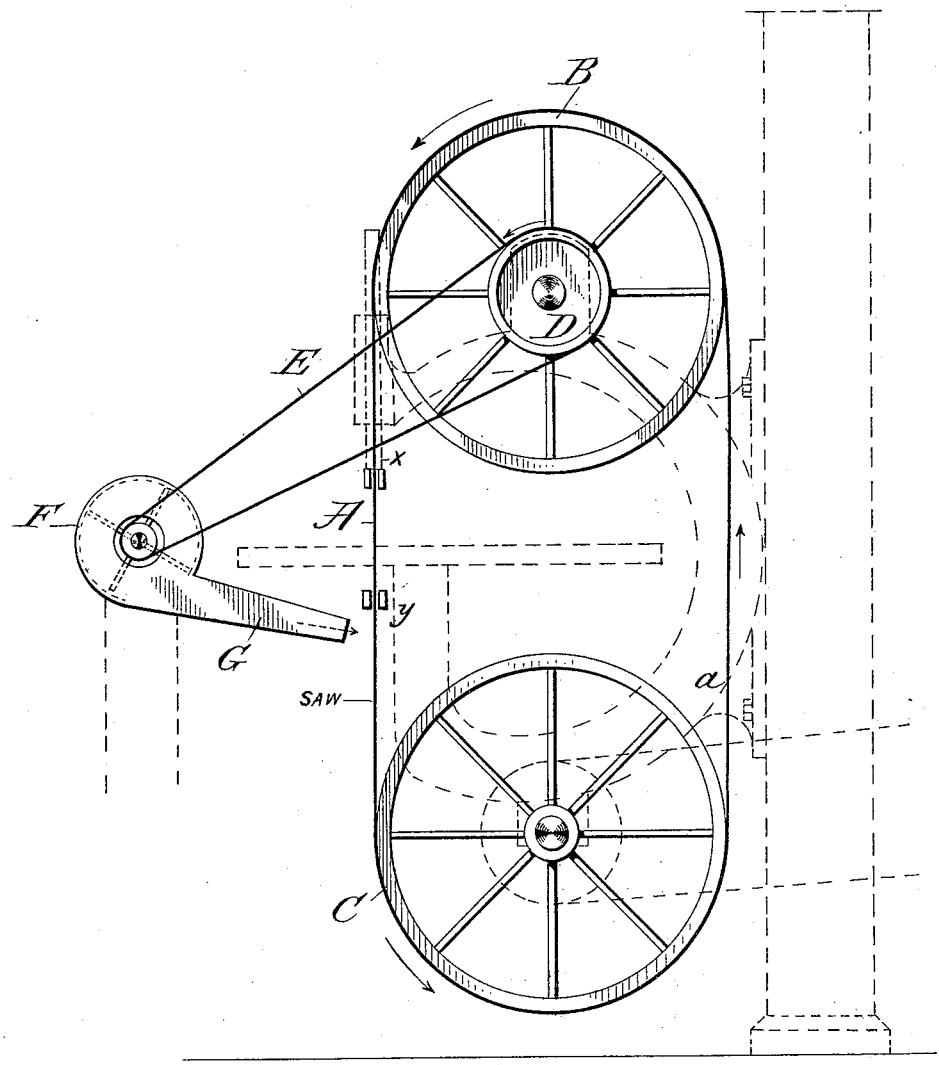

JAMES SHAVALIER AND AMASA HARVEY, OF MUSKEGON, MICHIGAN.

BAND-SAW MILL.

SPECIFICATION forming part of Letters Patent No. 337,630, dated March 9, 1886.

Application filed August 1, 1885. Serial No. 173,210. (No model.)

*To all whom it may concern:*

Be it known that we, JAMES SHAVALIER and AMASA HARVEY, citizens of the United States, residing at Muskegon, in the county of Muskegon and State of Michigan, have invented certain new and useful Improvements in Band-Saw Mills; and we do declare the following to be a full, clear, and exact description of the invention, such as will enable others skilled in the art to which it appertains to make and use the same, reference being had to the accompanying drawing, and to the letters and figures of reference marked thereon, which form a part of this specification.

Our invention relates to an improvement in band-saw mills, the object being to secure a uniform tension to that portion of the saw which passes through the log or other object that is being operated upon, in order that the cut of the saw may be uniform, the feed steady, and the entire operation of the saw effective; and the invention consists, essentially, in regulating or controlling the motion of the upper or driven wheel by any suitable means whatsoever provided that will give to the saw the uniform tension at the point desired. This broad feature of controlling the motion or rotation of the driven wheel of a band-saw to accomplish the purpose stated constitutes the chief novelty of our invention; but in order to show one particular means of applying this principle we have herein illustrated and described an example of the invention, which consists in attaching a belting to the upper driven wheel in such manner as that it shall not only operate and drive a blower located suitably to allow a stream of cool air to be directed upon the heated saw, and thus obviate the expansion of the same, but shall act as a retarder to said idle-wheel, while at the same time it will remove the sawdust from between the saw and its driving-pulley.

In the annexed drawing, illustrating this example of our invention, an ordinary band-saw is represented, and is provided with a blower connecting with the driven wheel of the saw by a belt and pulley.

C represents the driving-wheel, and B the driven or idle wheel of a band-saw mill, A being the band-saw, which encircles the two wheels, as shown in the drawing. $x\,y$ designates the portion of the saw which runs through the log, and which therefore will be the part liable to be expanded by the heat developed in the steel during the cutting operation of the saw.

F represents a box within which is situated a fan or blower of any suitable construction, which is driven by a belting, E, connected therewith and passing around a wheel or pulley, D, carried by the shaft of the wheel B. The spout G serves to conduct and guide in a single direction the wind generated by the revolution of the blower, and thus cause a steady stream of air to impinge upon the heated portion of the saw and diminish its expansion.

The purpose of the invention is, then, to secure a uniform tension to the part of the saw marked $x\,y$, and this is to be done by controlling the motion of the wheel B.

In the running of saw mills it is well known that the rapidity of the motion of the saw within the log heats the saw and causes it to expand. This expansion relaxes the tension of the saw and causes it to fit loosely around the two wheels B and C, instead of tightly, as before. In order to overcome this and keep the band-saw tight, the usual way hitherto has been to raise the wheel B enough to compensate for the slack in the saw, and some automatic device—such as a spring—has generally been employed to accomplish this result; but a great disadvantage attends this method of raising the driven wheel, for when the saw is cooling the contraction thereof has been found to be insufficient to restore the wheel to its original position by overcoming the pressure of the mechanism which raised it—*i. e.*, there is an inequality between the tension of a spring or other device requisite to elevate the wheel and the contractile force of the band-saw. The disastrous consequence that follows then is that the saw, being unable to force the wheel B downward, will crack or break, and so be rendered worthless for any further service. If the cracking or breaking should not take place in the manner that we have described, still if the wheel should keep exerting more and more pressure continually upward on the saw it would not be likely to long bear the strain, but would break or crack. It is this state of facts which hinders the introduction of band-saws into more general use in sawing wood, for manufacturers have the idea that the only way to acquire uniform tension in the saw is by raising the upper wheel, and since this uniform tension is a necessary desideratum for a band-saw, and since, also, it is not satisfactorily attainable by present methods, band-saw mills have lost a great amount of their practical value.

By controlling the motion of the wheel B, instead of by changing its position, the hurtful consequences do not ensue, and the wheel B, and not the wheel C, is the one to be controlled, since the wheel C is itself subject to the fluctuations of the motive power, so that at one time it will go faster than at other times, for if we retard the motion of the wheel C by diminishing the power which drives it, or by stretching any of the belts connecting therewith, it is evident that the upper wheel, B, will not be checked or retarded until it has taken out the expansion or slack of the bandsaw on the back of the wheels, and transferred the same slack to the saw on the side of the wheels next the log, or to the portion of the saw marked $x\ y$; hence if we try to run the wheels on that principle we should have a tighter and more uniform tension on the part of the saw behind the wheels than on the portion of the saw in front of them. This will give us a result opposite to what we wish, for it causes the saw to be slackened at the very point where its work is to be done, which is a condition in which it will not do the work it ought, will not run straight through the lumber, and will not produce a finished result. However, it happens in actual practice that there is a fluctuation in the speed of the wheel C, due to changes in the force of the driving-power; hence the result to the saw above referred to, following from these fluctuations, must be obviated as well as the consequences of the saw's expansion.

Instead, therefore, of raising the upper wheel, we propose to retard it; and the best way to retard it is to make it do a certain amount of work—as, for instance, to drive a fan, as in the example of our invention herein described—for when the motion of the wheel C has been retarded by lack of power, or by the stretching of any of the belts which drive it or the connecting mechanism, if we do not set the upper wheel, B, at work it will run ahead of the wheel C and pick up, as it were, the slack of the saw in the rear of the wheels; hence the result will be attained by stretching the saw on the rear side of the wheels so that it will not be of a uniform tension between the points $x\ y$.

Suppose we take hold of the saw at point $a$, and try to push it up in the direction of the arrow. We would take the slack all out of the saw on the log side between the points $x$ and $y$, and such slack or expansion would be noticeable just above $a$. Now, by controlling the motion of the upper wheel we get a uniform tension of the saw between $x$ and $y$.

If the wheels B and C are both running at the same speed, and we put a brake on the wheel B and try to stop it while the motion of the wheel C continues unimpeded, the desired effect would be observable—viz., the saw would be tight in front or on the log side, and if there were any slack or expansion in the saw it would be in the rear, behind the wheels.

In this example of our invention a belt, E, is attached to the pulley D upon the wheel B, and the fact that the wheel B has to drive this belt E and mechanism with which it connects serves to retard the wheel B sufficiently to accomplish the uniform tension of the saw between points $x$ and $y$.

Belt E drives a fan, as above stated, which causes a stream of air to emerge from the conductor G and cool the saw after it has been expanded by heat in sawing. Thus the expansion of the saw will be partially taken up by the gradual cooling effected by this fan or blower; also, the blower keeps away the sawdust from the face of the pulley or wheel C, so that the band-saw will have a true face and a true wheel to run on and the desired retardation of the upper wheel be accomplished.

We are aware that devices have heretofore been employed for applying a current of air to the saw for the purpose of cooling the same, and also for removing sawdust. These we do not, therefore, broadly claim.

Having thus described our invention, what we claim as new, and desire to secure by Letters Patent, is—

In a band-saw mill, the combination, with the idle or driven wheel B, of a fan or blower for directing a stream of cool air upon the saw, which fan is actuated by a belt-connection with said upper wheel in such manner as will retard the motion of the same, for the purpose of securing a uniform tension in the saw between the points $x$ and $y$, substantially as shown and described.

In testimony whereof we affix our signatures in presence of two witnesses.

JAMES SHAVALIER.
AMASA HARVEY.

Witnesses:
AUGUSTUS C. TRUESDELL,
ROBT. E. BUNKER.